US006994198B2

(12) United States Patent
Mordukhovich

(10) Patent No.: US 6,994,198 B2
(45) Date of Patent: Feb. 7, 2006

(54) COILED CLUTCH FRICTION MEMBER WITH DUAL-DIRECTIONAL MODULI OF ELASTICITY

(75) Inventor: Gregory Mordukhovich, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 52 days.

(21) Appl. No.: 10/833,731

(22) Filed: Apr. 28, 2004

(65) Prior Publication Data
US 2005/0077140 A1  Apr. 14, 2005

Related U.S. Application Data

(60) Provisional application No. 60/509,588, filed on Oct. 8, 2003.

(51) Int. Cl.
*F16D 69/00* (2006.01)
(52) U.S. Cl. .............................. 192/107 M; 192/107 R; 192/107 C; 192/113.34
(58) Field of Classification Search .................... None
See application file for complete search history.

(56) References Cited

U.S. PATENT DOCUMENTS

| | | | | |
|---|---|---|---|---|
| 1,493,433 A | * | 5/1924 | Guay et al. ............. | 192/107 R |
| 1,614,200 A | * | 1/1927 | Kattwinkel ............. | 188/251 R |
| 2,150,937 A | * | 3/1939 | Novak .................... | 192/107 M |
| 2,648,618 A | * | 8/1953 | Palumbo ................ | 192/107 M |
| 5,096,661 A | | 3/1992 | Lang ............................. | 419/2 |
| 5,615,758 A | | 4/1997 | Nels ...................... | 192/113.36 |
| 5,662,993 A | | 9/1997 | Winckler .................... | 442/101 |
| 5,842,551 A | | 12/1998 | Nels .......................... | 192/107 |
| 6,132,877 A | | 10/2000 | Winckler et al. ........... | 428/408 |
| 2003/0012940 A1 | | 1/2003 | Bowles et al. ........... | 428/297.4 |

\* cited by examiner

*Primary Examiner*—Richard M. Lorence
(74) *Attorney, Agent, or Firm*—Christopher DeVries

(57) ABSTRACT

A clutch friction member for engagement in a torque-transmitting mechanism includes a friction surface for sliding contact with an opposing reaction member. The sliding contact is characterized by a coefficient of friction and acts to engage the friction member with the reaction member. The friction member is formed from a plurality of coiled cords, each defining a first channel disposed in a first direction, preferably substantially normal to the sliding contact, and transporting lubricant through the clutch friction member in the first direction, to increase the coefficient of friction. The coiled cords are arranged adjacent to one another to form an annular ring. The friction member has second channels disposed in a second direction, preferably substantially parallel to the sliding contact, for transporting the lubricant through the friction member in the second direction. The second channels thereby decrease vibrational shudder resulting from the sliding contact.

19 Claims, 2 Drawing Sheets

COILED CLUTCH FRICTION MEMBER WITH DUAL-DIRECTIONAL MODULI OF ELASTICITY

CROSS-REFERENCE TO RELATED APPLICATIONS

This application claims the benefit of U.S. Provisional Application No. 60/509,588, filed Oct. 8, 2003, which is hereby incorporated by reference in its entirety.

TECHNICAL FIELD

This invention relates to a friction clutch member for use in a wet clutch application.

BACKGROUND OF THE INVENTION

A vehicle engine is traditionally coupled with a transmission for transmitting torque to the wheels via a torque converter. A wet friction interface may be used with the torque converter for establishing torque transfer under a slip condition (i.e., relative rotation of opposing surfaces forming the friction interface). U.S. Pat. No. 6,132,877, issued Oct. 17, 2000 to Winckler et al, assigned to General Motors Corporation, and hereby incorporated by reference in its entirety, describes a friction interface composed of a high density, low porosity, carbon composite material, infiltrated with chemical vapor deposited carbon and, preferably, having a substrate of a satin weave fabric. Another application of a friction interface used in a torque converter is described in U.S. Pat. No. 5,195,621, issued Mar. 23, 1993 to Dull et al, assigned to General Motors Corporation, and hereby incorporated by reference in its entirety. The use of friction material having a heat resistant paper support bearing resin-bonded carbon particles is known in the art, as described in U.S. Pat. No. 5,083,650, issued Jan. 28, 1992 to Seiz et al, assigned to Minnesota Mining and Manufacturing Company and to General Motors Corporation, which is hereby incorporated by reference in its entirety.

Additionally, a wet clutch with a friction interface may be used in lieu of a torque converter for vehicle launch with slip, especially on vehicles designed with a wider overall speed ratio, as the ratio-boosting affect of the torque converter may not be necessary in such an application.

SUMMARY OF THE INVENTION

A friction member that provides a high coefficient of friction at high slip speeds while minimizing vibrational shudder during vehicle launch is desired. Additionally, control of operational viscosity and shearability of the transmission fluid is desirable, as the coefficient of friction is affected by these properties.

A friction member for engagement in a torque-transmitting mechanism includes a plurality of adjacent, longitudinally-disposed coiled cords forming a friction surface. The friction member may be for a friction interface within a torque converter or a friction interface within a rotating or a stationary clutch (i.e., a braking clutch). The coiled cords define first channels in a first direction, preferably substantially normal to the friction surface. The coiled cords also define second channels in a second direction, preferably substantially parallel to the friction surface. The first and second channels are operable for transporting lubricant through the friction member in the first and second directions, respectively, such that the friction member is characterized by a first modulus of elasticity in the first direction and a greater second modulus of elasticity in the second direction.

The friction surface is operable for sliding contact with an opposing reaction member in the torque-transmitting mechanism. As used herein, and as will be readily understood by those skilled in the art, "sliding contact" means that there is relative sliding movement (i.e., slip) between the friction member and the reaction member; preferably, during "sliding contact", the friction surface and reaction member are generally separated from direct physical contact with one another by a layer of lubricant disposed therebetween. The sliding contact is characterized by a coefficient of friction. The sliding contact acts to engage the friction member and the reaction member in the torque-transmitting mechanism. The first and second moduli of elasticity cooperate to at least partially establish the coefficient of friction (i.e., maximize) and control vibrational shudder (i.e., minimize) resulting from the sliding contact. The first and second moduli of elasticity are at least partially based on the lubricant transport through the channels. Transport of lubricant through the first channels acts to increase the coefficient of friction u. Transport of lubricant through the second channels acts to at least partially decrease vibrational shudder.

The coiled cords may be deformable under pressure applied substantially in the first direction during the sliding contact with the opposing reaction member. The first and second channels remain at least partially open for transporting lubricant when the cords are so deformed.

Each of the coiled cords may be comprised of individual coils. Adjacent coils abut one another and adjacent coiled cords also abut one another. The abutment of the adjacent coils and coiled cords increases the second modulus of elasticity.

The friction surface may be characterized by a first shape when the coiled cords are not deformed, and a second shape having an area of sliding contact when the coiled cords are deformed during the sliding contact. The second shape is sufficiently flatter than the first shape such that the area of the sliding contact is sufficient to decrease vibrational shudder.

The first channels may include inter-cordal channels disposed between the adjacent coiled cords and/or inter-coil channels disposed between the adjacent coils. The second channels may be disposed longitudinally within the coiled cords.

Each of the coiled cords may be formed from carbon-based fibers. The carbon-based fibers may be bundled into a plurality of strings. The strings are woven together to form each of the coiled cords.

A power transmission includes a torque-transmitting mechanism. The torque-transmitting mechanism includes a friction member and an opposing reaction member. The friction member and the reaction member are selectively engageable for transmitting power. The friction member has a friction surface for sliding contact with the reaction member. The sliding contact is characterized by a coefficient of friction and acts to engage the friction member with the reaction member in torque-transmitting mechanism. The friction member is comprised of a plurality of adjacent, longitudinally-disposed coiled cords forming the friction surface. The coiled cords define first channels in the first direction substantially normal to the friction surface and the second channels in the second direction substantially parallel to the friction surface. The first and second channels are operable for transporting lubricant through the friction member in the first and second directions, respectively, such that the friction members characterized by a first modulus of elasticity in the first direction and a greater second modulus of elasticity in the second direction.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
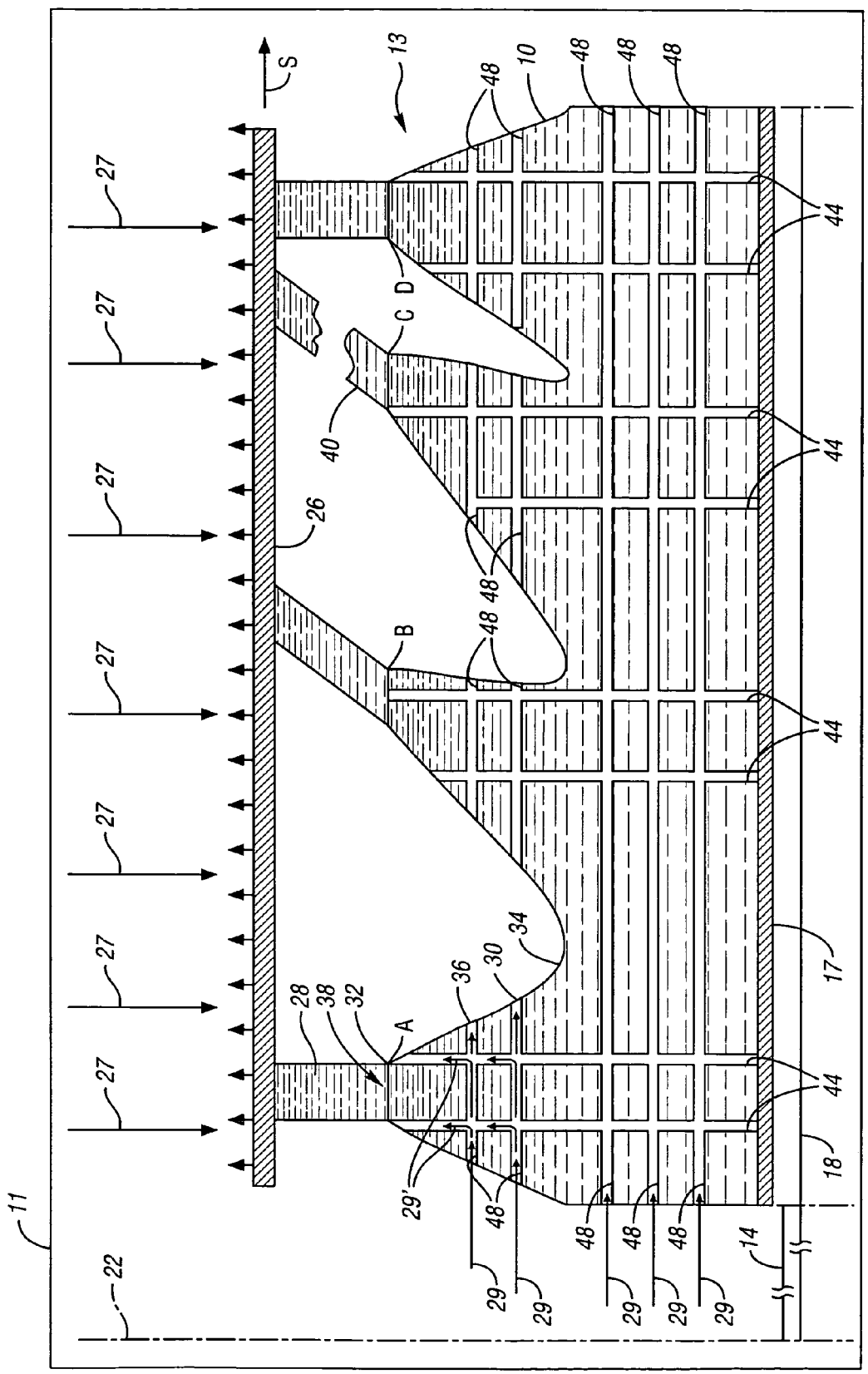
FIG. 1 is a schematic cross-sectional view of a friction member in sliding contact with a reaction plate, in accordance with the invention.

Referring to FIG. 1, a schematic radial cross-section of a friction member 10 for a transmission 11 is depicted. Preferably, the friction member 10 is an annular ring with an inner radius 14 and an outer radius 18 measured from a center axis of rotation 22. (A corresponding inner diameter and outer diameter are associated with the inner radius 14, and outer radius 18, respectively.) The material from which the friction member is formed has a modulus of elasticity E. The friction member 10 is connected to a clutch plate 17 using adhesives or other attachment mechanisms. The friction member 10 opposes a reaction member or reaction plate 26. The friction member 10 and reaction plate 26 are included in torque-transmitting mechanism 13, which may be a clutch within a torque converter included in the transmission 11. Alternatively, the torque-transmitting mechanism 13 may be a friction interface of a rotating clutch or stationary clutch (i.e., a brake). The reaction plate 26 may also be an annular ring with a like inner and outer radius. Transmission fluid, also referred to as lubricant or oil, is disposed in the transmission. Some of the fluid forms a column of oil 28 disposed between the reaction plate 26 and the friction member 10, as depicted in FIG. 1, such that engagement of the friction member 10 and the reaction plate 26 is a "wet clutch" application.

At a microscopic level, the friction member 10 is porous with an uneven, irregular surface 30. Elevational differences between a selected peak (high portion) 32 and valley (low portion) 34 forms a peaked portion 36. (The friction member 10 has a multitude of peaked portions of various heights, only one of which is schematically depicted in FIG. 1 at various stages of flex during sliding of the reaction plate 26 relative to the friction member 10.) When applied pressure (denoted by arrows 27) forces the reaction plate 26 and the friction member 10 toward one another, the actual contact area 38 (i.e., the area of the friction surface 30 over which sliding contact occurs) between the plate 26 and the friction member 10 is in the vicinity of the peak 32.

During the elasto-hydrodynamic (EHD) phase of clutch engagement, the column of oil 28 is disposed between the plate 26 and the friction member 10. During engagement, it may be desirable to have a period of slip (i.e., a velocity differential, also referred to as slip speed) between the friction member 10 and the reaction plate 26 to allow for a gradual torque transmission. The coefficient of friction u (i.e., the ratio of resulting tangential force between the friction member 10 and the reaction plate 26 to the applied normal force) may vary with slip speed, as it may be more difficult for the friction member 10 to "grab" to the reaction plate 26 at high slip speeds. It is desirable to maximize the coefficient of friction u at high slip speeds for efficient torque transfer. Generally, a friction member having a low modulus of elasticity in the direction normal to the actual contact area 38 (herein referred to as a first modulus of elasticity $E_1$) will increase the actual contact area 38, thus providing a greater coefficient of friction u than a friction member with a high modulus of elasticity in the normal direction.

The coefficient of friction u is also a function of the oil viscosity and shearability at the actual contact area 38. During frictional engagement, the viscous property of the column of oil 28 in contact with the peaked portion 36 causes the peaked portion 36 to bend or flex in the direction of slide (i.e., slip) between the friction member 10 and the plate 26. The bend or flex of the peaked portion 36 is proportional to its stiffness in the direction of slide (i.e., its modulus of elasticity in the radial direction, also referred to herein as the second modulus of elasticity, $E_2$). The direction of slip or slide is denoted in FIG. 1 by the arrow labeled S. As is schematically depicted in FIG. 1, during slide (i.e., slip), a given peaked portion 36 will bend from an original position A to an intermediate bent position B. At a later time, shear forces will cause the column of oil 28 at the contact area 38 to shear (depicted by sheared oil contact 40); at the shear point, the peaked portion 36, momentarily no longer subject to the viscous force of the column of oil 28, will spring back from a final bent position C to the position D, which is substantially the same as original position A. This spring-back of peaked portions during shear may contribute to vibrational shudder of the transmission. Accordingly, it is desirable to minimize the deformability of the friction member 10 in the direction of slide (which is parallel with the contact area 38), thus minimizing vibrational shudder. This may be accomplished by providing a relatively high second modulus of elasticity $E_2$ in the direction of slide. The fluid pressure in the friction member 10 may also influence shudder; for instance, a highly pressurized fluid acting on the friction member 10 may increase the modulus of elasticity $E_2$.

Vibrational shudder may be minimized by increasing the modulus of elasticity $E_2$ and/or decreasing the modulus of elasticity $E_1$. Shudder caused by "self excitation" of the friction member 10 may occur if the reaction plate 26 is not flat. During use, a reaction plate that is not flat may have different localized temperatures across it (due to an irregular contact area) causing variations in the height of a typical column of oil 28 between the reaction plate 26 and the friction member 10 and thus creating variations in cooling. As discussed below, temperature variations may lead to shudder. Decreasing the modulus of elasticity $E_1$ increases the damping capability of the friction member 10, allowing it to conform to the surface area of the reaction plate 26 (which is typically not perfectly flat), thus minimizing temperature variations.

Vibrational shudder may also occur if the reaction plate 26 and friction member 10 are not parallel upon engagement. Such a misalignment will cause a portion of the friction member 10 to contact the reaction plate 26 prior to the remainder of the friction member 10, resulting in pressure variations across the friction member 10. As discussed below, pressure variations cause temperature and oil viscosity variations, which may lead to shudder.

The coefficient of friction, the operational oil viscosity and the shearability of the oil at the contact area are functions of pressure and temperature at the contact area, as well as the pressure differential between the high portion 32 (i.e., the portion of the friction member 10 in sliding contact with the reaction plate 26) and the low portion 34 (i.e., the portion of the friction member 10 out of sliding contact with the reaction plate 26). Temperature is lower at higher pressures. In fact, the actual contact temperature may be up to 300° C., at which temperature the operational viscosity is very sensitive to pressure fluctuations. Accordingly, it follows that operational oil viscosity (which increases with increased pressure) must be kept high at high temperatures in order to minimize or avoid asperity contact. It should be noted that higher slip speeds lead to increased system temperatures. Additionally, the temperature at the contact area may be controlled (i.e., minimized) by one or more of (i) keeping the applied piston pressure low; (ii) increasing the actual contact area; and (iii) controlling the flow of oil past the contact area (permitting cooling thereof) by increasing the clutch oil pressure. With respect to the second alternative above, the actual contact area may be increased by modifying the surface design of the friction member 10. Minimizing temperature at the contact area also leads to a longer useful life of the lubricant, as the rate of depletion of friction modifier additives that may be in the lubricant is decreased at lower temperatures. Additionally, the pressure and temperature at the contact area and the pressure differential are affected by and, therefore, can be controlled by controlling the modulus of elasticity in the normal direction (i.e., the first modulus of elasticity, $E_1$) and the fluid pressure in the porous friction member 10.

The fluid pressure in the friction member 10 is a function of the radial porosity of the member 10, the pressure applied to the fluid from a pressure source such as a pump (not shown) as well as centrifugal forces acting to move fluid radially outward. With increasing clutch pressure, the coefficient of friction is increased at a given slip speed. Additionally, with fluid flow, the fluctuation or spike in the coefficient of friction u (felt as vibrational shudder) as the sliding speed approaches 0.00 m/s (i.e., near completion of clutching, after the slip launch phase) is lessened with respect to that which occurs when there is no fluid flow. The friction coefficient u typically experiences such a spike, causing shudder, near clutch completion. The coefficient of friction often decreases at higher slip speeds.

The friction member 10 is formed with first channels 44 disposed axially, in a first direction substantially normal to the sliding contact between the friction member 10 and the reaction plate 26. The first channels 44 are able to transport fluid to and from the contact area 38. Thus, the first channels 44 affect the temperature and pressure at the contact area as well as the pressure differential between the high portion 32 and low portion 34. The first channels 44 also affect the modulus of elasticity $E_1$ in the first direction. Preferably, the modulus of elasticity $E_1$ is significantly less than the modulus of elasticity E of the friction member 10 formed without the channels 44. Accordingly, the design of the first channels 44 may at least partially affect (e.g., increase) the friction coefficient u of the friction member 10 during engagement.

The friction member 10 is formed with second channels 48 disposed radially, in a second direction substantially parallel to the sliding contact area 38 between the friction member 10 and the reaction plate 26. The second channels 48 increase the porosity of the frictional member 10 in the sliding direction. Preferably, the second channels 48 remain at least partially open, permitting oil flow therethrough, even under loading by normal forces between the friction member 10 and the reaction plate 26. The channels 44 and 48 of FIG. 1 are shown schematically as straight, parallel and perpendicular lines for illustrative purposes; however, the channels 44, 48 are likely to be irregular in practice, having sufficient porosity to allow flow in the parallel and perpendicular directions.

Movement of fluid through the member 10 helps to cool the contact area 38 and control the pressure and pressure differentials near the contact area 38 (thereby increasing the coefficient of friction). While radial and normal porosity may contribute to such movement, they may also pressurize and thereby stiffen the friction member 10, increasing the modulus of elasticity in both the first direction (i.e., $E_1$, which may not be desirable because it thereby decreases the coefficient of friction u, as discussed above) and the second direction (i.e., $E_2$, which is desirable because it thereby decreases vibrational shudder, as discussed above). Additionally, centrifugal forces act upon the fluid, moving it radially outward. Thus, an oil supply to the second channels 48 from the inner radius 14 of the channels 48 (as shown by arrows 29 denoting fluid transport into the channels 48) will work with the centrifugal force whereas an oil supply from the outer radius of the channels 48 will work against centrifugal force, requiring a greater oil clutch pressure to move the fluid radially inward through the friction member 10. (Arrows 29' denote fluid transport from the channels 48 to the channels 44. Fluid transport is only shown in selected channels 44, 48, or portions thereof. Like fluid transport occurs throughout the channels 44, 48.)

Accordingly, an oil supply from the outer radius 18 of the channels 48 requires a greater fluid pressure than an oil supply from the inner radius 14 of the channels 48. A relatively greater fluid pressure leads to better shudder resistance (i.e., greater $E_2$ as described above) while a relatively lower fluid pressure leads to greater damping properties in the normal direction (i.e., lower $E_1$). The size and number of channels 44, 48 also affects the required fluid pressure to affect fluid flow through the channels, as will be readily understood to those skilled in the art. Thus, the selected size and number of the channels 44, 48, as well as the choice of supplying fluid from the inner versus the outer radius 14, 18, respectively, allows for an optimized, dual-directional moduli of elasticity in the friction member 10.

Figure 2A:
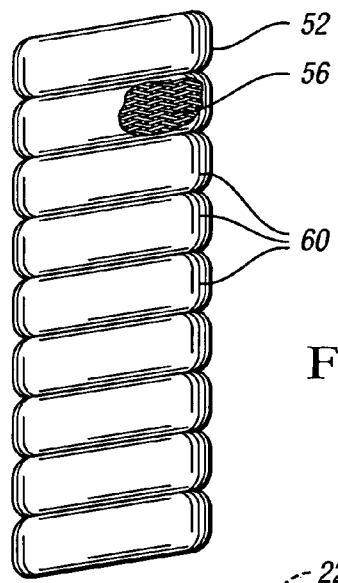
FIG. 2A is a schematic plan view of a coiled cord with part broken away, in accordance with of the invention.
Figure 2B:
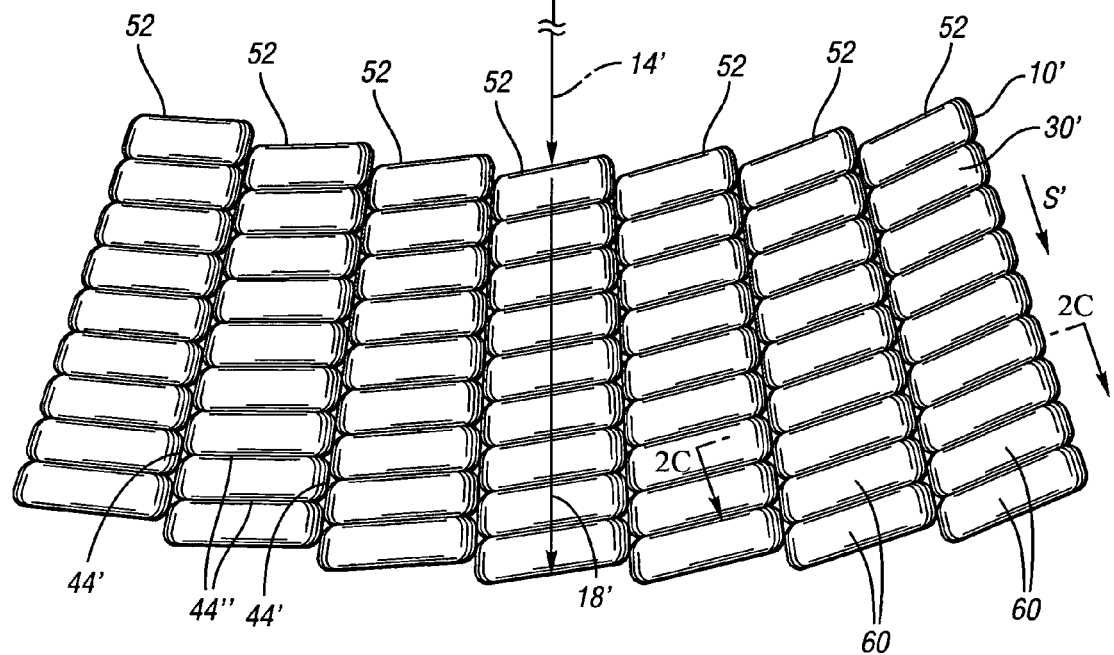
FIG. 2B is a schematic fragmentary plan view of a friction member formed by a plurality of the coiled cords of FIG. 2A.

Referring to FIG. 2A, an individual coiled cord 52 for use in a friction member 10' shown in FIG. 2B is depicted. The friction member 10' may be used as the friction member 10 of FIG. 1 to engage in sliding contact with the reaction plate 26. Preferably, the coiled cord 52 is formed from carbon fibers (not shown) bundled into strings 56. The strings 56 are then woven together to form the coiled cord 52. Those skilled in the art will recognize that a variety of weave patterns may be employed within the scope of the invention. The coiled cord 52 is forms a plurality of connected individual coils 60, and is similar in shape to a coiled telephone cord.

Referring to FIG. 2B, a plurality of coiled cords 52 are arranged adjacent to one another to form a friction member 10' shaped in an annular ring (only a portion of which is depicted) having an inner radius 14' and an outer radius 18' measured from a center axis of rotation 22'. During clutch engagement, a reaction plate (such as reaction plate 26 shown in FIG. 1) is frictionally engaged with the surface 30' of the friction member 10', with a normal force applied downward upon the surface 30'.

Preferably, the adjacent cords 52 are arranged such that clearance between each of the cords 52 and each of the coils 60 is minimized. This helps to increase the modulus of elasticity $E_2'$ of the friction member 10' in a second direction parallel to the direction of slide or slip, S', which is beneficial in reducing vibrational shudder (for the reasons discussed above). However, gaps or channels between each of the cords 52 (i.e., inter-cordal channels 44') as well as gaps or channels between each of the coils (i.e., inter-coil channels 44") exist even under pressure during clutch engagement.

Figures 2C, 2D:
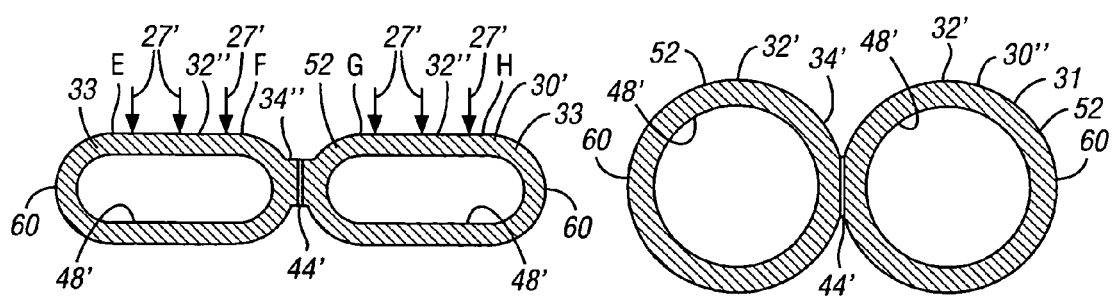
FIG. 2C is a schematic cross-sectional view of the friction member of FIG. 2B, taken at the arrows 2C shown in FIG. 2B.
FIG. 2D depicts the friction member of FIG. 2C in its normal (undeformed) state prior to application of clutch pressure.

Referring to FIG. 2C, a cross-sectional view taken at the arrows 2C—2C in FIG. 2B illustrates second channel 48' formed by cord 52 in the radial direction (i.e., the direction parallel to the direction of slide). The second channel 48' permits fluid flow in the direction of slide, contributing to a high second modulus of elasticity $E_2'$, as discussed above. The inter-cordal channels 44' and the inter-coil channels 44" (shown in FIG. 2B) (which may each be referred to as first channels) permit fluid flow in a direction perpendicular or normal to the direction of slide, thus aiding in cooling and pressure regulation at the contact area, as discussed above.

FIG. 2C illustrates the deformability of the cords 52 under applied pressure (denoted by arrows 27'). This deformability helps to decrease the modulus of elasticity in a first direction perpendicular to the direction of sliding contact S', that is, a first modulus of elasticity $E_1'$, thus increasing the coefficient of friction u, as discussed above. Notably, the second channels 48' remain open even during the deformation due to applied pressure. The close proximity of the cords 52 to one another causes the generally circular coils 60 to take on a more cornered, oval shape during deformation, as may be viewed in FIG. 2C. Referring to FIG. 2D, the coils 60 of FIG. 2C are shown in an undeformed state (in the absence of applied clutch pressure 27'). Thus, referring to FIG. 2C, during deformation, a flatter friction surface 30' may be achieved than the friction surface 30" of the undeformed coils of FIG. 2D. A flatter surface 30' creates an increased contact area which decreases the pressure of the contact. An increased contact area and decreased contact pressure increases oil viscosity and the coefficient of friction increases. Referring to FIG. 2D, when the coils 60 are in an undeformed state, the friction surface 30" has a first shape 31 denoted by peaks 32' and valleys 34'. Notably, absent deformation, the area of sliding contact of the undeformed coils 60 would be only in the immediate vicinity of the peaks 32'. Referring to FIG. 2C, when the coils 60 are in a deformed state, the friction surface 30' has a second shape 33 denoted by much less defined peaks 32" and valleys 34". Thus, the area of sliding contact of the deformed coils is much broader at each peak 32", e.g., approximately from points E to F and points G to H on the coils 60. Thus, more of the friction surface 30' is engaged in sliding contact with the reaction plate (not shown) when the coils are deformed. Thus, the flatter surface 30' contributes to a greater coefficient of friction in the direction of slip or slide, helping to reduce vibrational shudder, as discussed above.

While the best modes for carrying out the invention have been described in detail, those familiar with the art to which this invention relates will recognize various alternative designs and embodiments for practicing the invention within the scope of the appended claims.

What is claimed is:

1. A friction member for engagement in a torque-transmitting mechanism, said friction member comprising:
    a plurality of adjacent, longitudinally-disposed coiled cords forming a friction surface;
    wherein said coiled cords define first channels in a first direction with respect to said friction surface and define second channels in a second direction with respect to said friction surface;
    wherein said first and second channels are operable for transporting lubricant through the friction member in said first and second directions, respectively, such that the friction member is characterized by a first modulus of elasticity in said first direction and a second modulus of elasticity in said second direction; and
    wherein said second modulus is greater than said first modulus of elasticity.

2. The friction member of claim 1, wherein said friction surface is operable for sliding contact with an opposing reaction member in the torque-transmitting mechanism;
    wherein said sliding contact is characterized by a coefficient of friction, said sliding contact acting to engage the friction member with the reaction member in the torque-transmitting mechanism;
    wherein said first and second moduli of elasticity cooperate to at least partially establish said coefficient of friction and control vibrational shudder resulting from said sliding contact.

3. The friction member of claim 2, wherein said first direction is substantially normal to said sliding contact and said second direction is substantially parallel to said sliding contact.

4. The friction member of claim 3, wherein said coiled cords are deformable under pressure applied substantially in said first direction during said sliding contact; and
    wherein said first and second channels remain at least partially open for said transporting of lubricant when so deformed.

5. The friction member of claim 4, wherein said friction surface is characterized by a first shape when said coiled cords are not deformed;
    wherein said friction surface is characterized by a second shape having an area of sliding contact when said coiled cords are deformed during said sliding contact; and
    wherein said second shape is sufficiently flatter than said first shape, such that said area of sliding contact is sufficient to decrease vibrational shudder.

6. The friction member of claim 1, wherein each of said coiled cords is comprised of individual coils; wherein adjacent ones of said coils abut one another; wherein adjacent ones of said coiled cords abut one another, said abutment of said adjacent coils and coiled cords increasing said the second modulus of elasticity.

7. The friction member of claim 6, wherein said first channels include one of inter-cordal channels disposed between said adjacent coiled cords and inter-coil channels disposed between said adjacent coils.

8. The friction member of claim 1, wherein said second channels are disposed longitudinally within said coiled cords.

9. The friction member of claim 1, wherein each of said coiled cords is formed from carbon-based fibers, wherein said carbon-based fibers are bundled into a plurality of strings, and wherein said strings are woven together to form each of said coiled cords.

10. A power transmission comprising:
a torque-transmitting mechanism including:
a friction member;
an opposing reaction member, said friction member and reaction member being selectively engageable for transmitting power, said friction member having a friction surface for sliding contact with said reaction member, wherein said sliding contact is characterized by a coefficient of friction, said sliding contact acting to engage said friction member with said reaction member in said torque-transmitting mechanism;
wherein said friction member is comprised of a plurality of adjacent, longitudinally-disposed coiled cords forming said friction surface;
wherein said coiled cords define first channels in a first direction with respect to said friction surface and define second channels in a second direction with respect to said friction surface; and
wherein said first and second channels are operable for transporting lubricant through said friction member in said first and second directions, respectively, such that said friction member is characterized by a first modulus of elasticity in said first direction and a greater second modulus of elasticity in said second direction.

11. The power transmission of claim 10, wherein said first direction is substantially normal to said sliding contact and said second direction is substantially parallel to said sliding contact.

12. The power transmission of claim 10, wherein said first and second moduli of elasticity cooperate to at least partially establish said coefficient of friction and control vibrational shudder resulting from said sliding contact.

13. The power transmission of claim 10, wherein each of said coiled cords is comprised of individual coils, wherein adjacent ones of said coils abut one another, wherein adjacent ones of said coiled cords abut one another, said abutment of said adjacent coils and coiled cords increasing said second modulus of elasticity.

14. The power transmission of claim 10, wherein said coiled cords are deformable under pressure applied substantially in said first direction during said sliding contact; and
wherein said first and second channels remain at least partially open for said transporting of lubricant when so deformed.

15. The power transmission of claim 10, wherein said friction surface is characterized by a first shape when said coiled cords are not deformed;
wherein said friction surface is characterized by a second shape having an area of sliding contact when said coiled cords are deformed during said sliding contact; and
wherein said second shape is sufficiently flatter than said first shape, such that said area of sliding contact is sufficient to decrease vibrational shudder.

16. The power transmission of claim 10, wherein said first channels include one of inter-cordal channels disposed between said adjacent coiled cords and inter-coil channels disposed between said adjacent coils.

17. The power transmission of claim 10, wherein said second channels are disposed longitudinally within said coiled cords.

18. The power transmission of claim 10, wherein each of said coiled cords is formed from carbon-based fibers, wherein said carbon-based fibers are bundled into a plurality of strings, and wherein said strings are woven together to form each of said coiled cords.

19. A friction member for engagement in a torque-transmitting mechanism, said friction member comprising:
a plurality of adjacent, longitudinally-disposed coiled cords forming a friction surface;
wherein said coiled cords define first channels in a first direction substantially normal to said friction surface and define second channels in a second direction substantially parallel to said friction surface;
wherein said first and second channels are operable for transporting lubricant through the friction member in said first and second directions, respectively, such that the friction member is characterized by a first modulus of elasticity in said first direction and a greater second modulus of elasticity in said second direction;
wherein said friction surface is operable for sliding contact with an opposing reaction member in the torque-transmitting mechanism;
wherein said sliding contact is characterized by a coefficient of friction, said sliding contact acting to engage the friction member with the reaction member in the torque-transmitting mechanism;
wherein said first and second moduli of elasticity cooperate to at least partially establish said coefficient of friction and control vibrational shudder resulting from said sliding contact;
wherein said coiled cords are deformable under pressure applied substantially in said first direction; and
wherein said first and second channels remain at least partially open for said transporting of lubricant when so deformed.

* * * * *